UNITED STATES PATENT OFFICE.

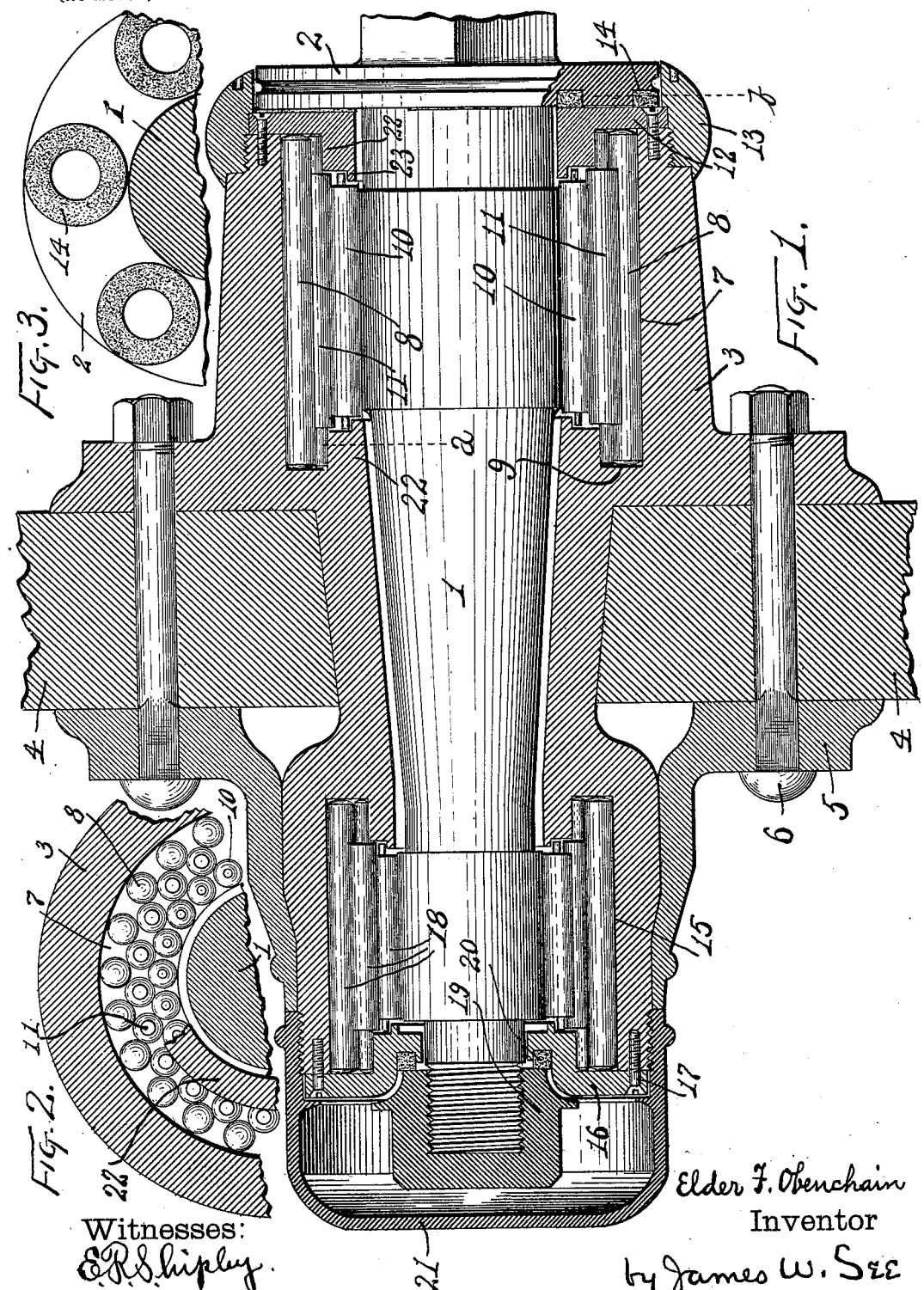

ELDER F. OBENCHAIN, OF LOGANSPORT, INDIANA.

ROLLER-BEARING.

SPECIFICATION forming part of Letters Patent No. 635,505, dated October 24, 1899.

Application filed May 8, 1899. Serial No. 715,936. (No model.)

*To all whom it may concern:*

Be it known that I, ELDER F. OBENCHAIN, of Logansport, Cass county, Indiana, have invented certain new and useful Improvements in Roller-Bearings, (Case B,) of which the following is a specification.

This invention pertains to improvements in roller-bearings adapted for use where a shaft turns within an exterior body forming a box or where an exterior body forming a hub turns upon an axle.

I illustrate my improvements in connection with the axle and hub of a vehicle—as a wagon, fire-engine, or the like.

The improvements will be readily understood from the following description, taken in connection with the accompanying drawings, in which—

Figure 1 is a longitudinal section of a vehicle-hub combined with its axle and exemplifying my invention; Fig. 2, a vertical transverse section of the same in the plane of line *a*, and Fig. 3 a vertical transverse section of the axle in the plane of line *b*.

In the drawings, 1 indicates a vehicle-axle of not unusual form, comprising an inner and outer journal portion, the latter being of less diameter than the former; 2, the usual axle-collar; 3, the wheel-hub, which in this case forms the body surrounding the axle; 4, the wheel-spokes engaging the hub; 5, the clamp-flange engaging over the outer portion of the hub and against the outer faces of the spokes, which are clamped between this clamp-flange and an appropriate flange fast on the hub; 6, the usual spoke-clamping bolts; 7, a cylindrical counterbore at the inner end of the hub concentric with the inner journal portion of the axle; 8, an annular series of cylindrical rollers disposed within the counterbore 7 and bearing against the circumferential wall of that counterbore, the ends of these rollers being preferably rounded where they make contact with the end walls of the counterbore, the length of the rollers being such as to permit a trifle of end play to the rollers or, at least, to guard against the possibility of end binding; 9, an annular concentric groove in the end wall of counterbore 7; 10, an annular series of rollers disposed within counterbore 7 and engaging the periphery of the journal portion of the axle within that counterbore, these rollers being provided with small end journals, these rollers, with their journals, being shorter than rollers 8; 11, an annular series of intermediate rollers engaging between rollers 8 and 10, the rollers 11 having bodies shorter than rollers 8 and having end journals, each of the series of rollers 8, 10, and 11 containing an equal number of rollers; 12, a flange secured against the inner end of the wheel-hub and forming one of the walls for the counterbore containing the several series of rollers, this flange having a bore sufficiently large to readily pass over that portion of the axle-journal engaged by rollers 10; 13, a keeper-ring screwed upon the inner end of the hub and flanging inwardly over against flange 12, this ring encircling collar 2 of the axle to form a dust-guard; 14, a series of annular recesses formed in the outer face of axle-collar 2 and engaged by leather washers filling the recesses and projecting a trifle outwardly beyond the face of the collar; 15, a concentric counterbore in the outer end of the hub around the smaller journal portion of the axle; 16, a flange secured against the outer end of the hub and forming the outer end wall for counterbore 15; 17, screws securing flange 16 to the hub, the outer end of the hub thus being provided with a roll-holding chamber similar to that at the inner end of the hub; 18, three series of rollers similar to those heretofore referred to, but disposed at the outer end of the wheel-hub and pertaining to the outer journal portion of the axle; 19, the axle-nut; 20, a leather washer disposed between the axle-nut and flange 16; 21, a cap screwing upon the outer end of the hub; 22, concentric ledges at the end walls of counterbore 7, one being formed upon flange 12 and the other at the end wall of counterbore 7, the peripheries of these ledges forming tracks concentric with the journal of the axle and being engaged by the end journals of intermediate rollers 11, and 23 concentric ledges projecting inwardly from ledges 22, their peripheries being engaged by the end journals of rollers 10.

The counterbore, rollers, ledges, &c., at the outer end of the hub are similar to those at the inner end of the hub.

As the hub turns upon the axle the rollers turn by rolling contact with each other and with the surfaces of the journals and counterbores, the direction of motion of the rollers being obviously such as to permit of rolling instead of sliding motion. Endwise motion of the hub upon the axle is limited by collar 2 and axle-nut 19, violent jars due to end thrust being avoided or modified by leather washers 14 and ring 20, washers 14 serving also to absorb lubricating material and when the leather is compressed under the effect of end thrust of the hub yield up the lubricating material for distribution over the metallic surfaces within and between the washers.

By removing cap 21 and then removing axle-nut 19 the wheel may be removed from the axle, the collars still being retained within their appropriate counterbores by reason of the end journals upon the inner circles of rollers.

By removing flanges 12 and 16 the rollers are freed and may be removed from their counterbores when the hub is off the axle.

The end journals of the inner rolls 10 engage ledges 23 loosely—that is to say, it is not intended that the journals shall have any working contact with the ledges, these ledges 23 being designed to serve merely as roller-retainers when the hub is off the axle; but ledges 22, while they in their turn serve as roller-retainers for the two outer series of rollers, have a very much more important office to fulfil. It is well known that in either ball-bearings or roller-bearings the tendency of the load upon the axle is to cause downward movement of the axle and the spreading of the lower balls or rollers, the result of the spreading being the upward crowding of the balls or rollers, this crowding under ordinary conditions bringing contiguous balls or rollers into rubbing contact under conditions of opposite rotation, thus greatly negativing the desired purpose of roller-bearings and ball-bearings of converting all friction into rolling friction. The triple series of rolls is of course designed to avoid this possibility of rubbing contact between contiguous rollers turning in opposite directions; but there is the same spreading and crowding tendency as in the case just referred to, the load upon the axle tending to spread the lower rolls and cause the rolls to flow upwardly in two "streams," so to speak, and pack closer at the top of the bearing. There is necessarily some degree of looseness of the axle within the inner series of rolls and there is necessarily some degree of lost motion between the rolls themselves. The axle therefore under the effect of loading obviously takes up a position below the normal center of the bearing. The spreading of the lower rollers as they are wedged apart by the axle permits a still farther descent of the axle, and this farther descent of the axle makes still more room in the upper portion of the counterbore into which the upwardly-moving streams of rollers might crowd. The system would therefore present the aspect of a descending axle forcing upwardly two streams of rollers and making room for those streams at the top to follow the axle downwardly, under which conditions the concentricity of the several series of rollers is disturbed and improper rubbing contacts might take place; but in my present invention the ledges 22 guard against this possibility, for no matter how much the axle may descend, as permitted by its looseness or by the stripping of the lower rolls, it is impossible for the outer and intermediate rolls to follow the axle downwardly at the top of the bearing, owing to the fact that the end journals of the intermediate rolls 11 engage ledges 22. It follows that the two outer series of rolls will always be concentric with each other and with the hub and that there can be no crowding or displacing movement of any of the rolls, except such as is due to their own looseness of nesting—that is to say, if the axle seeks to spread the lower rollers and crowd the rollers upwardly the rollers will find their abutment against portions of the hub at the outer wall of the counterbore and at ledges 22. It will thus be observed that under the strains of work ledges 22 at the top of the system become working tracks for the intermediate rollers. In the illustration all of the rollers are of the same diameter, though this need not be the case, for the rolls of each series may differ in diameter; but whatever be the diameter of the rolls the peripheral speed is the same for all of them. Rolls 8 travel on the in wall of the counterbore. Rolls 11 turn at the same peripheral rate of speed, but travel in a smaller circle. Hence if the end journals of rollers 11 were as large as the bodies of the rollers and ledges 22 were of corresponding diameter rubbing friction would take place on ledges 22. Hence the end journals of rollers 11 are reduced and ledges 22 enlarged, so as to equalize the rates of travel of the surfaces of the system. The diameters of ledges 23 and of the end journals of inner rolls 10 call for no calculation as they have no working contacts.

I claim as my invention—

1. In a roller-bearing, the combination, substantially as set forth, of a journal, a body surrounding the same and provided with a cylindrical counterbore concentric with the journal, ledges projecting inwardly from the ends of said counterbore and having peripheries concentric therewith, a series of rollers disposed within the counterbore and engaging said journal, a series of rollers disposed within the counterbore and engaging the inner wall thereof, and a series of rollers disposed within the counterbore and engaging the rollers of the two before-mentioned series and having end journals engaging the peripheries of said ledges.

2. In a roller-bearing, the combination, substantially as set forth, of a cylindrical journal, a body surrounding the same and provided with a cylindrical counterbore concentric with the journal and having a concentric ledge on the end wall of its counterbore, a flange removably secured to the end of said body and forming the removable end wall to said counterbore and having a concentric ledge upon its inner face, a series of cylindrical rollers within said counterbore and engaging said journal and having ends engaging said ledges, a series of cylindrical rollers within said counterbore and engaging the inner wall thereof and equal in number to the rolls in the first-mentioned series, and a series of cylindrical rolls disposed annularly between the two before-mentioned series of rollers and containing rolls equal in number to those in each of the other series.

3. In a roller-bearing, the combination, substantially as set forth, of an axle-journal, an axle-nut screwed upon the outer extremity of the axle, a hub surrounding the axle and having a flange engaging outwardly against said nut and having concentric counterbores around the axle-journal, a series of cylindrical rollers within each of said counterbores, an axle-collar at the inner end of the axle-journal and engaging against the inner end of the hub and having circular recesses in its outer face, and leather washers disposed in said recesses and projecting outwardly from the face of the collar.

ELDER F. OBENCHAIN.

Witnesses:
 DANIEL WOODHOUSE,
 CHARLES KREIS.